(12) United States Patent
Kuo

(10) Patent No.: US 7,564,632 B2
(45) Date of Patent: Jul. 21, 2009

(54) PROJECTION ZOOM LENS

(75) Inventor: Chung-yuan Kuo, Tantz Shiang (TW)

(73) Assignee: Asia Optical Co., Inc, Taichung (TW)

( * ) Notice: Subject to any disclaimer, the term of this patent is extended or adjusted under 35 U.S.C. 154(b) by 0 days.

(21) Appl. No.: 12/121,009

(22) Filed: May 15, 2008

(65) Prior Publication Data
US 2008/0285142 A1    Nov. 20, 2008

(30) Foreign Application Priority Data
May 18, 2007    (TW) .............................. 96117677 A

(51) Int. Cl.
*G02B 15/14* (2006.01)
(52) U.S. Cl. .................. 359/683; 359/676; 359/680
(58) Field of Classification Search ................ 359/676, 359/680–682, 683
See application file for complete search history.

(56) References Cited
U.S. PATENT DOCUMENTS
6,545,817 B2 * 4/2003 Hirose ..................... 359/683
7,016,118 B2 * 3/2006 Wada ....................... 359/676
7,079,324 B2 * 7/2006 Yamasaki ................. 359/680

* cited by examiner

Primary Examiner—Scott J Sugarman

(57) ABSTRACT

A projection zoom lens includes, from a screen side to an image source side, a first lens group having a negative refractive power, a second lens group having a positive refractive power, a third lens group having a positive refractive power, a fourth lens group having a negative refractive power and a fifth lens group having a positive refractive power. Zooming the projection zoom lens from the wide-angle end to the telephoto end causes the second, third and fourth lens groups to move toward the screen side, and the first and fifth lens groups are kept stationary. The projection zoom lens may further include an auto iris being axially movable with the fourth lens group, a composite prism and a cover glass. The projection zoom lens satisfies several conditions so that it can effectively eliminate aberrations and improve the projection image quality.

13 Claims, 5 Drawing Sheets

LONGITUDINAL SPHERICAL ABERRATION

LATERAL CHROMATIC ABERRATION

FIELD CURVATURE

LONGITUDINAL SPHERICAL ABERRATION

LATERAL CHROMATIC ABERRATION

FIELD CURVATURE

PROJECTION ZOOM LENS

BACKGROUND OF THE INVENTION

1. Field of the Invention

The present invention relates to a projection zoom lens, and more particularly to a projection zoom lens for use in a projection optical system of a projector and also for an image-taking optical system of an image-taking device.

2. Description of the Prior Art

Projectors have been widely used in many applications among which the most important application is compact-sized image-related devices. For example, a projector connected to a portable computer or a desktop computer can satisfy many specific requirements of different environments. A commonly known projector, such as a DLP (Digital Light Processing) projector, uses a digital micro-mirror device (DMD) modulator as a light valve, wherein minute mirror-surface elements (micro-mirrors) are arranged in an array corresponding to pixels and form an image by controlling the angles of the respective mirror-surfaces, and a projection zoom lens enlarges and display the image on a large screen.

Quality of a projected image displayed on a large screen is generally determined by the light valve, the projection zoom lens, and other imaging components thereof. Generally, the projection zoom lens is a compound lens composed of a combination of a plurality of lens elements, at least including a converging lens and a diverging lens, with an attempt to minimize deterioration in resolution, spherical aberration, chromatic aberration, and other type of aberrations.

A conventional projection zoom lens, which is disclosed in U.S. Pat. No. 6,590,716 B2, includes a first lens group having a negative refractive power, a second lens group having a positive refractive power, a third lens group having a negative refractive power, and a fourth lens group having a positive refractive power. When the projection zoom lens varies power from a limit wide-angle power toward a limit telephoto power, the first and fourth lens groups are kept stationary and the second and third lens groups undergo proper movement along the optical axis to thereby change the overall focal length. However, this patent only provides the condition between some lens elements of the first and second lens groups, and does not disclose any relationship between the third and other lens groups. Since the movement of the third lens group directly affects the quality of an image projected by the projection zoom lens, it is desired to provide improved modification of the known projection zoom lens in order to realize high quality of image projection.

Hence, it is desired to provide a projection zoom lens of the kind just described above that effectively removes the shortcoming of conventional design and device.

BRIEF SUMMARY OF THE INVENTION

Accordingly, an object of the present invention is to provide a projection zoom lens that effectively eliminating aberrations and improving the quality of projected images.

To achieve the above object, in accordance with the present invention, a projection zoom lens is provided for projecting a source image or original image from an image source to a projection side or screen side to form a projected image. The projection zoom lens comprises, in order from the screen side (enlargement side) to the image source side (reduction side), a first lens group having a negative refractive power, a second lens group having a positive refractive power, a third lens group having a positive refractive power, a fourth lens group having a negative refractive power, and a fifth lens group having a positive refractive power. To zoom from a wide-angle end to a telephoto end, the second, third, and fourth lens groups move toward the screen side and the first and fifth lens groups are kept stationary.

In accordance with the present invention, the projection zoom lens satisfies the following conditions:

$$\left|\frac{fw23}{fw}\right| - \left|\frac{ft23}{fw}\right| > 0.06743 \quad (1)$$

$$\left|\frac{fw23}{ft}\right| - \left|\frac{ft23}{ft}\right| > 0.05621 \quad (2)$$

where fw23 represents the combined refractive power of the second and third lens groups at the wide-angle end; ft23 represents the combined refractive power of the second and third lens groups at the telephoto end; fw represents the focal length of the projection zoom lens at the wide-angle end; and ft represents the focal length of the projection zoom lens at the telephoto end.

When the projection zoom lens is incorporated in an image projector system, the "image source side" of the projection zoom lens indicates an image-forming device of the image projector system that generates a source (original) image to be projected through the projector system or an image-forming device to which the image projector system is coupled to receive the source image generated by the image-forming device, and the screen side indicates a screen or a surface to which the original image is projected to form a projected image. It is noted that the term "screen side" is also used to indicate one side of a lens element or other element or a lens group of the present projection zoom lens system that is close to the projection screen; similarly, the "image side" refers to the side of a lens element or other element or a lens group of the present projection zoom lens system that is close to the image-forming device or the image source.

In accordance with the present invention, all the lens elements of the first to fifth lens groups of the present projection zoom lens are preferably made of glass and all the surfaces of the lens elements are spherical. The present projection zoom lens further comprises an auto iris arranged on the screen side of the fourth lens group and being axially movable therewith.

The present projection zoom lens further satisfies the following conditions:

$$\left|\frac{fw234}{fw}\right| - \left|\frac{ft234}{fw}\right| > 0.11256 \quad (3)$$

$$\left|\frac{fw234}{ft}\right| - \left|\frac{ft234}{ft}\right| > 0.09383 \quad (4)$$

where fw234 represents the combined refractive power of the second, third and fourth lens groups at the wide-angle end; and ft234 represents the combined refractive power of the second, third and fourth lens groups at the telephoto end. Similar to what indicated above, fw and ft are focal lengths of the projection zoom lens at the wide-angle end and the telephoto end respectively.

In comparison with the prior art, the projection zoom lens according to the present invention comprises five lens groups and when the projection zoom lens is zoomed from the wide-angle end to the telephoto end, the second, third and fourth lens groups are moved along the optical axis while the first and fifth lens groups are kept stationary. The projection zoom lens of the present invention is required to satisfy several conditions for effectively eliminating aberrations and improving the projection image quality. Moreover, the present projection zoom lens is heat-resisting because of all the lens elements being made of glass, whereby the projection zoom lens is not easily subjected to change of optical performance thereof caused by temperature variation. Further, since all the lens elements that constitute the projection zoom lens system of the present invention are made spherical, manufacturing and machining of the lenses are easy, leading to good yield and low cost.

BRIEF DESCRIPTION OF THE DRAWINGS

The present invention may best be understood through the following description with reference to the accompanying drawings, in which.

DETAILED DESCRIPTION OF THE PREFERRED EMBODIMENT

Figure 1A:
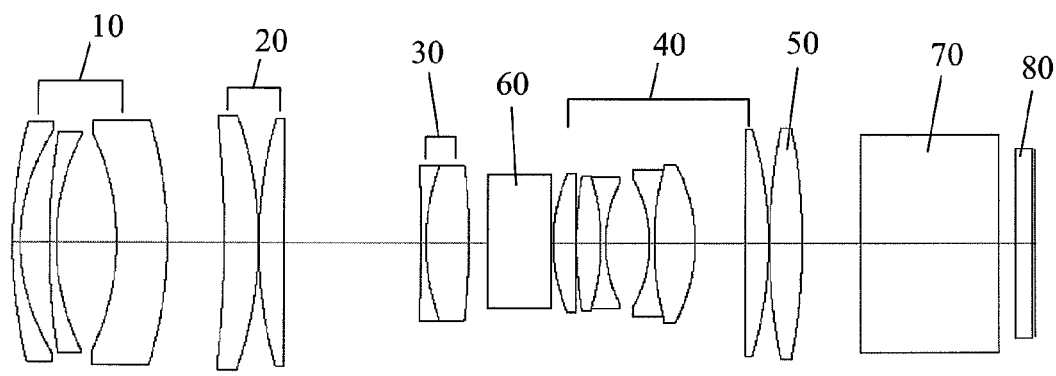
FIG. 1A schematically shows lens construction of a projection zoom lens according to the present invention at the wide-angle end.
Figure 1B:
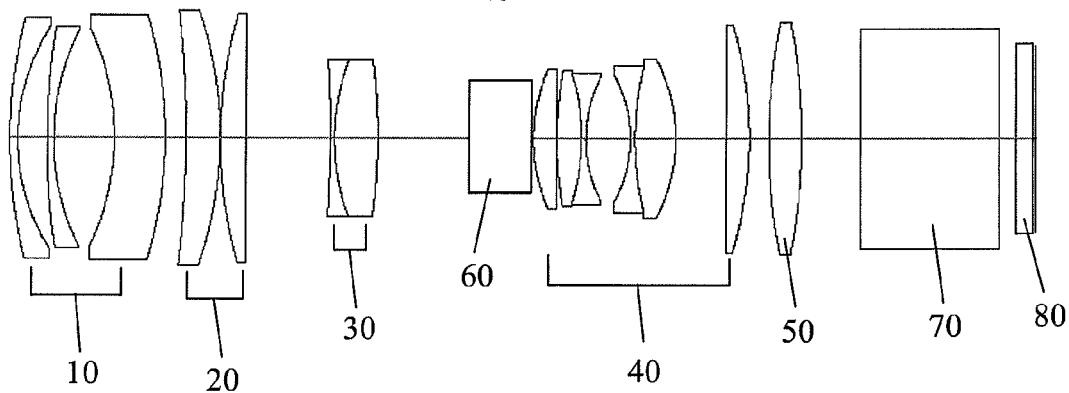
FIG. 1B schematically shows the lens construction of the projection zoom lens according to the present invention at the telephoto end.
Figure 2A:
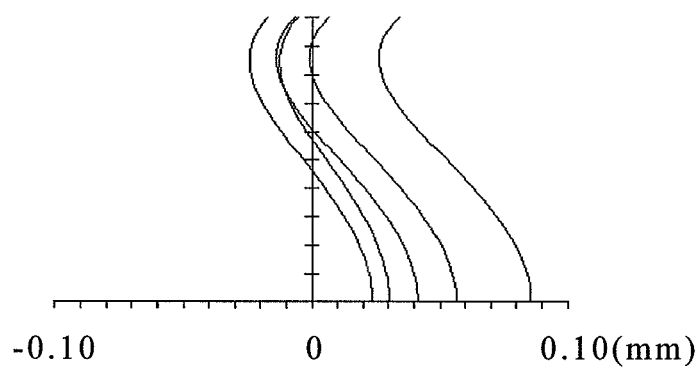
FIGS. 2A-2E respectively show longitudinal spherical aberration, lateral chromatic aberration, field curvature, distortion and MTF curves associated with the projection zoom lens shown in FIG. 1A at the wide-angle end.
Figure 2B:
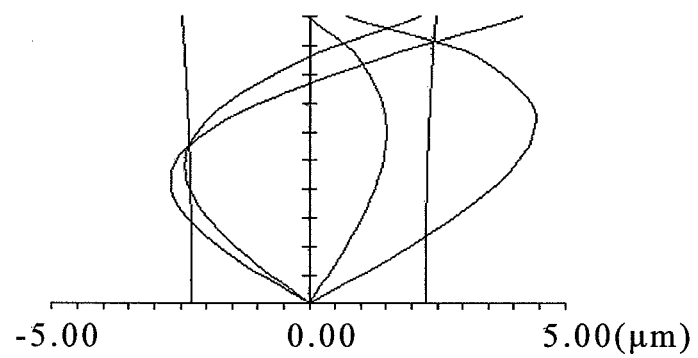
Figure 2C:
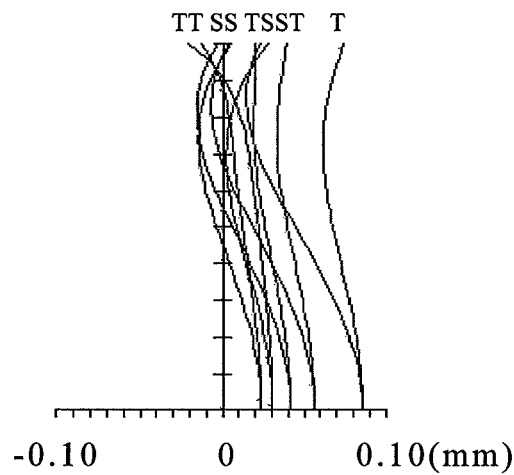
Figure 2D:
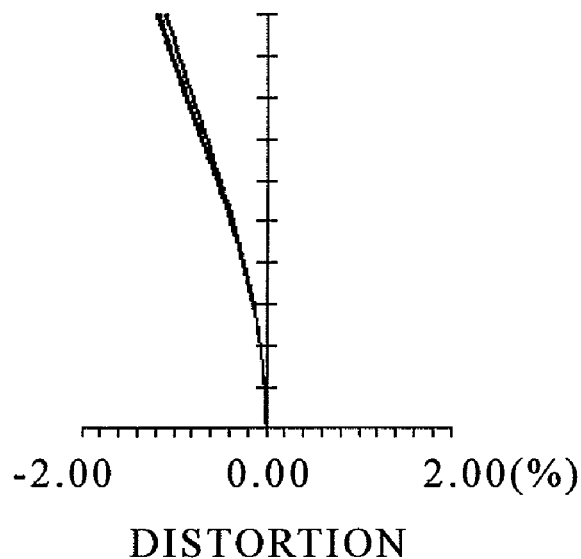
Figure 2E:
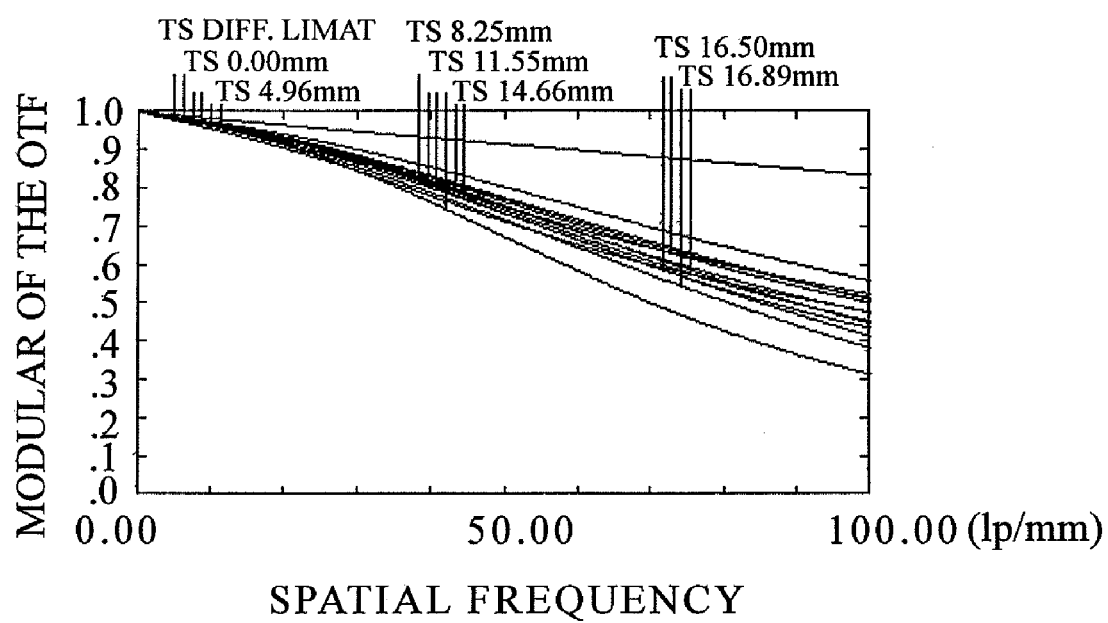
Figure 3A:
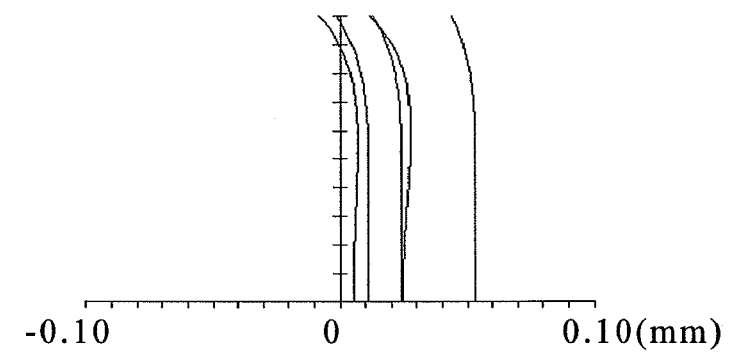
FIGS. 3A-3E respectively show longitudinal spherical aberration, lateral chromatic aberration, field curvature, distortion and MTF curves associated with the projection zoom lens shown in FIG. 1B at the telephoto end.
Figure 3B:
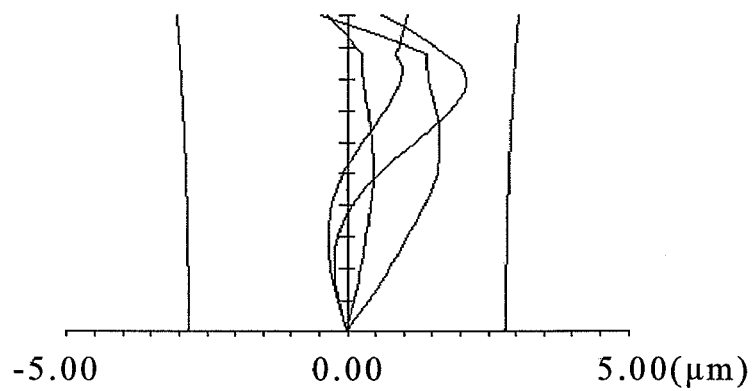
Figure 3C:
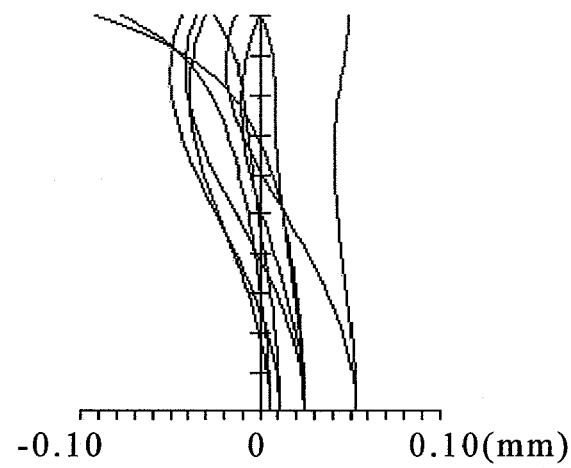
Figure 3D:
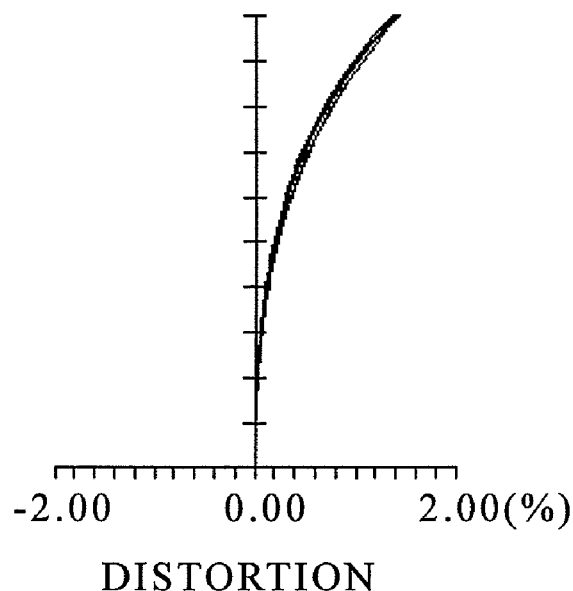
Figure 3E:
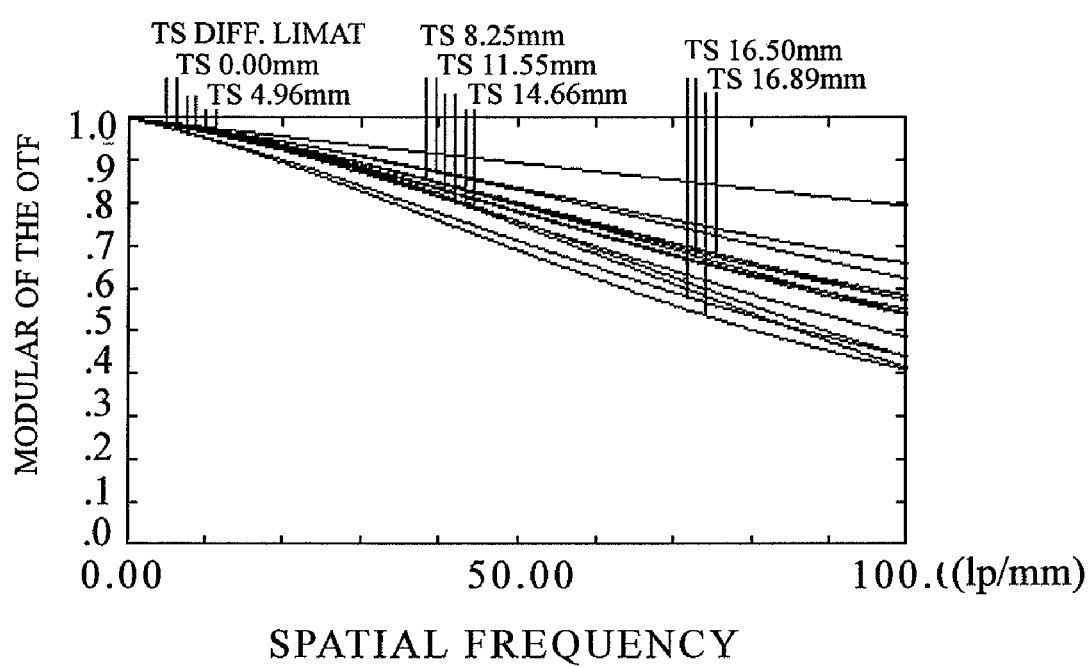

With reference to the drawings and in particular to FIGS. 1A and 1B, which respectively show the lens construction of a projection zoom lens in accordance with the present invention, generally designated at 1, at a wide-angle end and a telephoto end. The projection zoom lens 1 of the present invention is applicable to a front projector having a telecentric optical system, of which an example is a digital light processing (DLP) projector, for projecting an original image generated or formed by a DMD modulator, which serves as an image source side (the right side as viewed in FIG. 1A) to a large screen which serves as a screen side (the left side as viewed in FIG. 1A).

The present projection zoom lens 1, which is used to project an original or source image from the image source side to a screen side to form a projected image, comprises, in order from the screen side to the image source side, a first lens group 10 having a negative refractive power, a second lens group 20 having a positive refractive power, a third lens group 30 having a positive refractive power, a fourth lens group 40 having a negative refractive power and a fifth lens group 50 having a positive refractive power. Zooming the projection zoom lens 1 from the wide-angle end to the telephoto end causes the second, third and fourth lens groups 20, 30 and 40 to move toward the screen side, while the first and fifth lens groups 10 and 50 are kept stationary.

It is noted that in the following description, unless particularly specified, all sequence mentioned is referred to the sequence in a direction from the screen side to the image source side.

The first lens group 10 consists of three lens elements, which are of positive, positive, and negative power respectively. In the embodiment illustrated, the three lenses are convex-concave lens, convex-concave, and concave-convex lenses respectively.

The second lens group 20 consists of two lens elements, which are of negative and positive powers respectively. In the embodiment illustrated, the two lenses are respectively a concave-convex lens and a convex-plane lens. When the projection zoom lens 1 varies power from the wide-angle (enlargement) power toward the telephoto (reduction) power, the second lens group 20 is moved toward the first lens group 10 along an optical axis of the projection zoom lens 1 within a first variable distance D1. (The specific value range of D1 is shown in the following Date Table 1.)

The third lens group 30 is a cemented doublet element, which in the embodiment illustrated, consists of a concave-concave lens and a convex-convex lens. In zooming as described above, the third lens group 30 is movable toward the second lens group 20 along the optical axis within a second variable distance D2. (The specific value range of D2 is shown in the following Date Table 1.)

The fourth lens group 40 consists of six lenses, respectively having positive, positive, negative, negative, positive, negative powers. In the embodiment illustrated, the six lenses are respectively a convex-plane lens, a convex-convex lens and a concave-concave lens that are cemented together, a concave-concave lens and a convex-convex lens that are cemented together, and a plane-convex lens, which are counted from the screen side to the image source side. When the projection zoom lens 1 is zoomed from the wide-angle end to the telephoto end, the fourth lens group 40 is moved toward the third lens group 30 along the optical axis within a third variable distance D3 and is moved away from the fifth lens group 50 along the optical axis within a fourth variable distance D4. (The specific value ranges of D3 and D4 are shown in the following Date Table 1.)

The fifth lens group 50 comprises a single lens element, which is a positive power lens and is, in the embodiment illustrated, a convex-convex lens. The fifth lens group 50 is kept stationary during zooming of the projection zoom lens 1.

The present projection zoom lens 1 further comprises an aperture stop 60 arranged on the screen side of the fourth lens group 40 (namely between the third lens group 30 and the fourth lens group 40). The aperture stop 60 is movable in unison with the fourth lens group 40 along the optic axis. In the embodiment illustrated, the aperture stop 60 comprises an auto iris that can control the aperture to adjust the amount of light, thereby obtaining a high contrast and high-resolution projection image.

The present projection zoom lens 1 further comprises a composite prism 70 and a cover glass 40 arranged on the image source side of the fifth lens group 50 (namely between fifth lens group 40 and the image source, such as a DMD modular) for improving the quality of the original image formed on the DMD modulator.

All the lens elements of the first to fifth lens groups 10 to 50 are made of glass, and thus the present projection zoom lens 1 features excellent heat resistance. And any change caused by temperature variation can be compensated by adjusting the distance D1 between the first and the second lens groups 10, 20. Accordingly, the projection zoom lens 1 of the instant invention provides stable optical performance and is resistant to temperature so that is it not easily subjected to change of performance thereof by temperature variation. Further, since all the surfaces of the lens elements of the present projection zoom lens 1 are spherical, they are easy to machine and have good yield and low cost.

The present projection zoom lens 1 is applicable to high-end digital lens system and can focus and zoom in and out by simply moving the second, third and fourth lens groups 20, 30 and 40. In order to obtain the best projection image quality, the present projection zoom lens 1 satisfies the following conditions:

$$\left|\frac{fw23}{fw}\right| - \left|\frac{ft23}{fw}\right| > 0.06743 \quad (1)$$

$$\left|\frac{fw23}{ft}\right| - \left|\frac{ft23}{ft}\right| > 0.05621 \quad (2)$$

$$\left|\frac{fw234}{fw}\right| - \left|\frac{ft234}{fw}\right| > 0.11256 \quad (3)$$

$$\left|\frac{fw234}{ft}\right| - \left|\frac{ft234}{ft}\right| > 0.09383 \quad (4)$$

where fw23 represents the combined refractive power of the second and third lens groups 20 and 30 at the wide-angle end; ft23 represents the combined refractive power of the second and third lens groups 20 and 30 at the telephoto end; fw234 represents the combined refractive power of the second, third and fourth lens groups 20, 30 and 40 at the wide-angle end; ft234 represents the combined refractive power of the second, third and fourth lens groups 20, 30 and 40 at the telephoto end; fw represents the focal length of the projection zoom lens 1 at the wide-angle end; and ft represents the focal length of the projection zoom lens 1 at the telephoto end.

The present invention can be more fully understood by reading the Numerical Embodiment given below. Numerical data of the Numerical Embodiment is listed in the following table (Data Table 1).

In Data Table 1 given below according to the Numerical Embodiment, "i" represents the order of lens surface from the screen side to the image source side, "Ri" represents the radius of curvature (mm) of the ith lens surface, "D" represents the thickness of each lens element or the distance (mm) between the ith surface and the (i+1)th surface, and "Nd" and "Vd" respectively represent the refractive index (d-line) and Abbe number (d-line) of each lens element. It is also noted that "W" indicates the wide-angle end and "T" the telephoto end.

DATA TABLE 1

Focal length = 38.87 mm(W) to 46.63 mm(T)
F Number (FNO) = 2.40(W) to 3.00(T)

| Surface (i) | Ri (mm) | D (mm) | Nd | Vd |
|---|---|---|---|---|
| 1 | 90.33 | 1.40 | 1.72825 | 28.5 |
| 2 | 37.99 | 5.26 | | |
| 3 | 133.71 | 1.20 | 1.48749 | 70.2 |
| 4 | 44.68 | 10.87 | | |
| 5 | −46.30 | 9.20 | 1.69679 | 55.5 |
| 6 | −76.14 | D1 (from 10.4069 to 3.8000) | | |
| 7 | −198.07 | 6.20 | 1.83481 | 42.7 |
| 8 | −70.33 | 0.10 | | |
| 9 | 84.99 | 4.51 | 1.84666 | 23.8 |
| 10 | ∞ | D2 (from 25.0924 to 15.3404) | | |
| 11 | −221.92 | 0.80 | 1.60342 | 38.0 |
| 12 | 40.53 | 7.86 | 1.72916 | 54.7 |
| 13 | −110.83 | D3 (from 3.5800 to 16.5894) | | |
| 14 | S | 11.58 | | |
| 15 | 32.36 | 4.07 | 1.49699 | 81.5 |
| 16 | ∞ | 0.10 | | |
| 17 | 69.91 | 4.48 | 1.72916 | 54.7 |
| 18 | −41.27 | 0.80 | 1.76182 | 26.5 |

DATA TABLE 1-continued

Focal length = 38.87 mm(W) to 46.63 mm(T)
F Number (FNO) = 2.40(W) to 3.00(T)

| Surface (i) | Ri (mm) | D (mm) | Nd | Vd |
|---|---|---|---|---|
| 19 | 24.55 | 8.13 | | |
| 20 | −23.33 | 0.80 | 1.75520 | 27.5 |
| 21 | 54.45 | 7.45 | 1.49699 | 81.5 |
| 22 | −30.77 | 9.11 | | |
| 23 | ∞ | 7.45 | 1.84666 | 23.8 |
| 24 | −71.79 | D4 (from 0.1533 to 3.5056) | | |
| 25 | 110.32 | 6.02 | 1.84666 | 23.8 |
| 26 | −110.32 | 10.60 | | |
| 27 | ∞ | 25.00 | BK7 | |
| 28 | ∞ | 3.00 | | |
| 29 | ∞ | 3.00 | FSL5 | |
| 30 | ∞ | 0.48 | | |

Aberrations can be effectively corrected by the present projection zoom lens 1 according to the above Numerical Embodiment.

In fact, the projection zoom lenses 1 described in the above embodiment is a reverse-telephoto lens, wherein the screen side (the side onto which an original image is projected to form a projected image) is regarded as an image side, the image source side (the side which is one surface of an image-forming device, for example, the DMD modulator) is regarded as an object side. However, when the optical performance of the projection zoom lens 1 of the example is evaluated on the side of the image-forming device, the screen side is supposed to be an object plane, the image source side is supposed to be an image plane, and the projection zoom lenses 1 is looked as a reduction optical system in optical terms. When the present projection zoom lens 1 is at the wide-angle end, aberrations observed at the reduction end of the reduction optical system (namely the image source side of the present projection zoom lens 1) are respectively shown in FIGS. 2A-2E. When the present projection zoom lens 1 is at the telephoto end, aberrations observed at the reduction end of the reduction optical system are respectively shown in FIGS. 3A-3E.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A projection zoom lens comprising, in order from a screen side to an image source side, a first lens group having a negative refractive power, a second lens group having a positive refractive power, a third lens group having a positive refractive power, a fourth lens group having a negative refractive power and a fifth lens group having a positive refractive power; wherein, during zooming from a wide-angle end to a telephoto end, the second, third and fourth lens groups move toward the screen side, while the first and fifth lens groups are kept stationary, and wherein the following conditions are satisfied:

$$\left|\frac{fw23}{fw}\right| - \left|\frac{ft23}{fw}\right| > 0.06743; \text{ and}$$

$$\left|\frac{fw23}{ft}\right| - \left|\frac{ft23}{ft}\right| > 0.05621$$

where fw23 represents combined refractive power of the second and third lens groups at the wide-angle end; ft23 represents combined refractive power of the second and third lens groups at the telephoto end; fw represents focal length of the projection zoom lens at the wide-angle end; and ft represents the focal length of the projection zoom lens at the telephoto end.

2. The projection zoom lens as claimed in claim 1, wherein the lens elements that constitute the first to fifth lens groups are glass-made spherical lens.

3. The projection zoom lens as claimed in claim 1 further comprising an aperture stop arranged between the third and fourth lens groups and movable in unison with the fourth lens group.

4. The projection zoom lens as claimed in claim 3, wherein the aperture stop comprises an auto iris.

5. The projection zoom lens as claimed in claim 1 further comprising a composite prism and a cover glass adapted to be arranged between the fifth lens group and an image-forming device that generates and provides a source image to the projection zoom lens.

6. The projection zoom lens as claimed in claim 1, wherein the first and second lens groups set a first variable distance therebetween, which is variable between 10.4069 mm and 3.8000 mm between the first and second lens groups in zooming of the projection zoom lens; wherein the second and third lens groups set a second variable distance therebetween, which is variable between 25.0924 mm and 15.3404 mm between the second and third lens groups in zooming of the projection zoom lens; wherein the third and fourth lens groups set a third variable distance therebetween, which is variable between 3.5800 mm and 16.5894 between the third and fourth lens groups in zooming of the projection zoom lens; and wherein the fourth and fifth lens groups set a fourth variable distance therebetween, which is variable between 0.1533 mm and 3.5056 mm between the fourth and fifth lens groups in zooming of the projection zoom lens.

7. The projection zoom lens as claimed in claim 1 further satisfying the following conditions:

$$\left|\frac{fw234}{fw}\right| - \left|\frac{ft234}{fw}\right| > 0.11256; \text{ and}$$

$$\left|\frac{fw234}{ft}\right| - \left|\frac{ft234}{ft}\right| > 0.09383$$

where fw234 represents combined refractive power of the second, third and fourth lens groups at the wide-angle end and ft234 represents combined refractive power of the second, third and fourth lens groups at the telephoto end.

8. A projection zoom lens comprising, in order from a screen side to an image source side, a first lens group having a negative refractive power, a second lens group having a positive refractive power, a third lens group having a positive refractive power, a fourth lens group having a negative refractive power and a fifth lens group having a positive refractive power; wherein, during zooming from a wide-angle end to a telephoto end, the second, third and fourth lens groups move toward the screen side, while the first and fifth lens groups are kept stationary, and wherein the following conditions are satisfied:

$$\left|\frac{fw23}{fw}\right| - \left|\frac{ft23}{fw}\right| > 0.06743;$$

$$\left|\frac{fw23}{ft}\right| - \left|\frac{ft23}{ft}\right| > 0.05621;$$

$$\left|\frac{fw234}{fw}\right| - \left|\frac{ft234}{fw}\right| > 0.11256; \text{ and}$$

$$\left|\frac{fw234}{ft}\right| - \left|\frac{ft234}{ft}\right| > 0.09383$$

where fw23 represents combined refractive power of the second and third lens groups at the wide-angle end; ft23 represents combined refractive power of the second and third lens groups at the telephoto end; fw represents focal length of the projection zoom lens at the wide-angle end; ft represents focal length of the projection zoom lens at the telephoto end; fw234 represents combined refractive power of the second, third and fourth lens groups at the wide-angle end and ft234 represents combined refractive power of the second, third and fourth lens groups at the telephoto end.

9. The projection zoom lens as claimed in claim 8, wherein the lens elements that constitute the first to fifth lens groups are glass-made spherical lens.

10. The projection zoom lens as claimed in claim 8 further comprising an aperture stop arranged between the third and fourth lens groups and movable in unison with the fourth lens group.

11. The projection zoom lens as claimed in claim 10, wherein the aperture stop comprises an auto iris.

12. The projection zoom lens as claimed in claim 8 further comprising a composite prism and a cover glass adapted to be arranged between the fifth lens group and an image-forming device that generates and provides a source image to the projection zoom lens.

13. The projection zoom lens as claimed in claim 8, wherein the first and second lens groups set a first variable distance therebetween, which is variable between 10.4069 mm and 3.8000 mm between the first and second lens groups in zooming of the projection zoom lens; wherein the second and third lens groups set a second variable distance therebetween, which is variable between 25.0924 mm and 15.3404 mm between the second and third lens groups in zooming of the projection zoom lens; wherein the third and fourth lens groups set a third variable distance therebetween, which is variable between 3.5800 mm and 16.5894 between the third and fourth lens groups in zooming of the projection zoom lens; and wherein the fourth and fifth lens groups set a fourth variable distance therebetween, which is variable between 0.1533 mm and 3.5056 mm between the fourth and fifth lens groups in zooming of the projection zoom lens.

* * * * *